United States Patent [19]
Chadbourne et al.

[11] 3,946,685
[45] Mar. 30, 1976

[54] HOVER CONTROL VALVE FOR SUBMARINE HOVERING SYSTEM

[75] Inventors: Barry O. Chadbourne; William H. Stoddard, both of North Stonington, Conn.

[73] Assignee: The United States of America as represented by the Secretary of the Navy, Washington, D.C.

[22] Filed: July 11, 1974

[21] Appl. No.: 487,527

[52] U.S. Cl. ...... 114/16 E; 137/625.32; 137/625.46
[51] Int. Cl.² .................. B63G 8/14; F16K 11/085
[58] Field of Search. 114/16 E; 137/625.31, 625.32, 137/625.46, 625.47

[56] References Cited
UNITED STATES PATENTS

| | | | |
|---|---|---|---|
| 17,643 | 6/1857 | Simmons | 137/625.32 |
| 696,691 | 4/1902 | McCormack | 137/625.32 X |
| 2,887,977 | 5/1959 | Piry | 114/16 E |
| 2,972,972 | 2/1961 | Allen | 114/16 E |
| 3,624,692 | 11/1971 | Lux | 137/625.32 X |

*Primary Examiner*—Henry T. Klinksiek
*Attorney, Agent, or Firm*—R. S. Sciascia; R. Beers; P. Schneider

[57] ABSTRACT

A hydrodynamically balanced quiet control valve for a submarine (underwater vehicle) hovering system. The valve has a cylindrical valve element within a four-port valve housing. The interior of the valve element is divided into three chambers by a pair of parallel partitions extending lengthwise of the element and equally spaced from the element axis. Apertures in the cylindrical wall of the element are arranged, in cooperation with the partitions, to produce substantially constant total flow resistance through the valve when installed in the system, regardless of the angular rotation of the cylindrical valve element. A hover computer controls the angular position of the element in response to sensed pressure variations from the pressure at a preselected hovering depth.

17 Claims, 7 Drawing Figures

3,946,685

HOVER CONTROL VALVE FOR SUBMARINE HOVERING SYSTEM

BACKGROUND OF THE INVENTION

This invention relates to fluid handling systems for submarine hover control and more particularly to a multi-port rotary valve having substantially constant total flow resistance independently of the angular rotation of the rotary valve element.

The terms "hovering" or "hover" as used herein and as understood in the art to which this invention pertains refers to a submarine vessel operating condition wherein the vessel is ballasted in such a way that its depth below the water surface remains substantially constant and the horizontal velocity of the vessel is substantially zero with respect to the surrounding water. The term "total flow resistance" as used herein to describe the function of the rotary hover valve of this invention refers to the sum of the flow resistances of all flow paths through the valve and system for all angular valve element operative positions regardless of flow distribution.

In the past, submarine hovering systems have used three-way angle ball valves to control ballast water flooding of or discharging from two hovering tanks through the three ball valve ports. One port is an inlet and two are outlet ports, one for each of the two hovering tanks. Such valves are typically not hydrodynamically balanced nor are flow velocities through them controlled in a way to minimize flow generated noise. To maintain a constant volume of flow in prior systems using three-way rotary valves, the degree of valve opening was controlled to accommodate the variation in flow resistance required. Water was flooded to one vented tank and blown to sea from the other. The flood and blow tanks were switched as one tank filled and the other emptied. Since most prior systems do not use pumps, the two tank system requires continued use of the ship's air banks.

SUMMARY OF THE INVENTION

In the submarine hovering system of the present invention, a four-port rotary valve is provided with a rotatable cylindrical valve element having a plurality of apertures in its cylindrical wall. The apertures are sized and arranged such that the total flow resistance of the system as seen by a pump remains substantially constant for any angular position of the valve element. This feature permits utilization of a constant delivery pump without variation of flow rate. A unidirectional flow pump, i.e. not-reversible, may be used in the present hovering system since the direction and rate of flow into and out of the hover tank is controlled by the angular position of the rotary valve element rather than by a reversible pump. The use of a system which pumps into and out of the same tank substantially reduces the amount of air used from the ship's air banks since the total ballast on board does not significantly change. Flow velocity through the hovering system, in particular through the apertures in the cylindrical wall of the valve element, is maintained at a sufficiently low magnitude to significantly reduce flow generated noise as compared to prior systems. For small errors in ordered hover depth the flow rate between the sea and the hover tank is varied by changing the angular position of the valve element rather than by varying the pump delivery rate. The rotary hover valve is provided with a recirculate position so that frequent starting and stopping of the pump is unnecessary. This feature helps to eliminate undesirable depth "hunting" when the submarine vessel is at or near ordered hover depth.

OBJECTS OF THE INVENTION

It is therefore an object of the present invention to improve the operating characteristics of submarine hovering systems by providing a multiport rotary control valve which produces substantially constant total system flow resistance for all rotational positions of operation.

Another object of the invention is reduce flow generated noise of submarine hovering systems.

It is a further object of the invention to provide a submarine hovering system having a substantially constant flow rate and which utilizes an economical unidirectional, constant delivery pump and a constant speed pump motor.

A feature of the invention is the number, size and arrangement of the apertures in opposite portions of the valve element cylindrical wall to achieve the substantially constant total system flow resistance for all operating positions of the hover valve.

Other objects, advantages and novel features of the invention will appear from a reading of the following detailed description when considered in conjunction with the accompanying drawings.

DETAILED DESCRIPTION OF THE INVENTION

Figure 1:
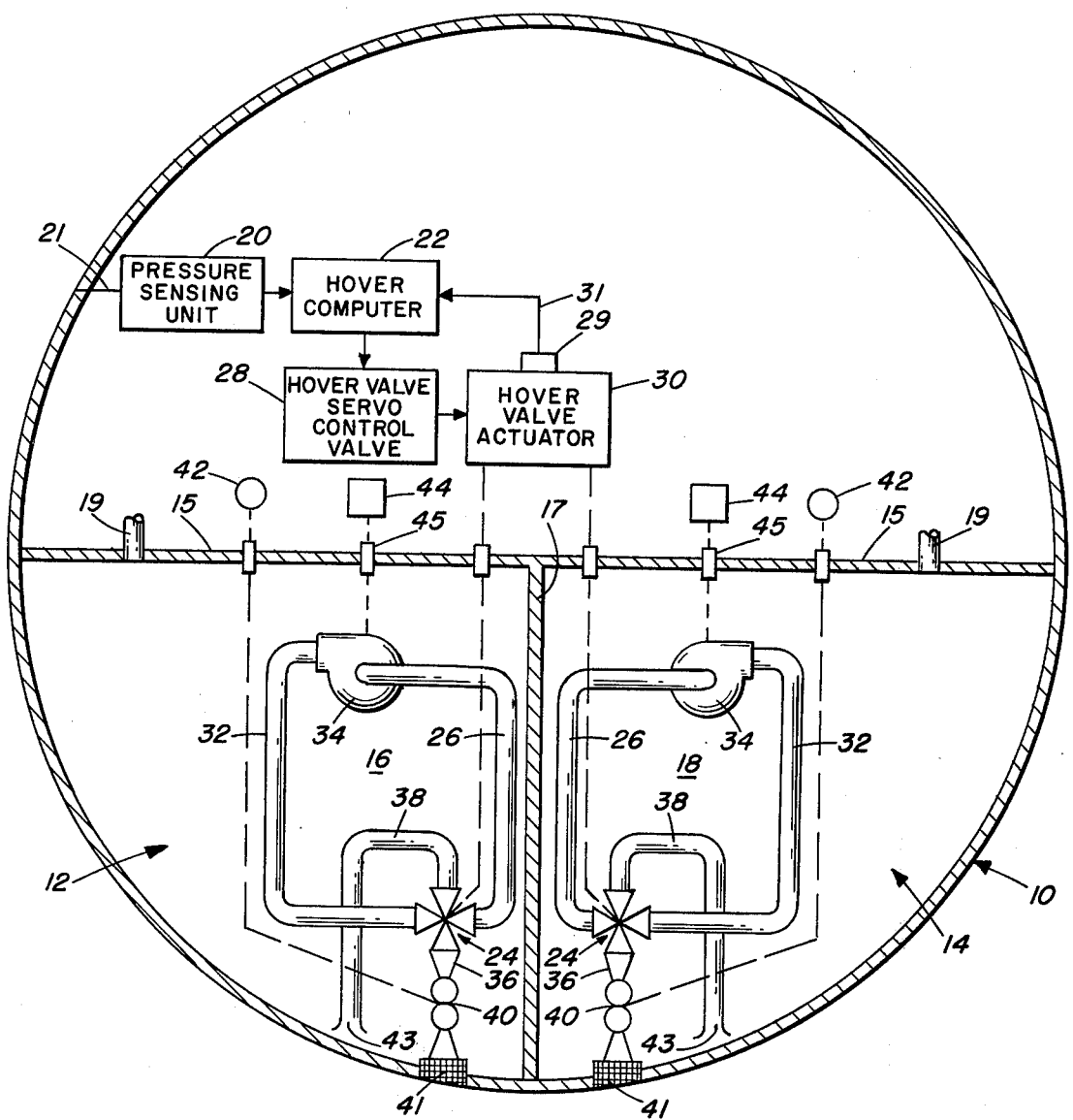
FIG. 1 is a schematic diagram of a submarine hovering system.

Referring now to the drawings wherein like reference characters represent like parts throughout the several views, and initially to FIG. 1, the pressure hull 10 of a submarine vessel has contained therein two hover tanks 12, 14 defined by the lower portion of the hull 10, horizontal pressure boundary 15 and a vertical pressure boundary 17. The hover tanks 12 and 14 are capable of withstanding the extreme pressures encountered at the submarine operating depths and are adapted to be flooded with sea water to decrease submarine buoyancy or pumped free of sea water to increase submarine buoyancy. An independently controlled air pressure system (not shown) is connected to each hover tank through pipes 19 for pressurizing or venting the air above the ballast water in each tank. In this manner, the hover tank pressure is maintained at ambient sea pressure, the advantage of which will be subsequently described herein. Identical pumping systems 16, 18 are shown in FIG. 1, each being separately located in one of the hover tanks 12, 14. Locating the pumping systems within the tanks advantageously results in considerable volume conservation in the living and operating spaces of the submarine vessel and permits the use of low pressure piping and components in the hovering system except for the hull valve. A pressure sensing unit 20, mounted within the hull 10, communicates by well-known means with ambient sea pressure through line 21 and generates an electrical signal proportional to the difference between the pressure at a preselected hover depth and ambient sea pressure, i.e. depth error. The electrical signal is transmitted to a hover computer 22 which processes the depth error signal to determine submarine velocity and acceleration. The computer output signal is related to depth error, velocity and acceleration and positions the hover valves 24, through the servo control valve 28 and hover valve actuator 30. This either pumps sea water from or to the hover tanks 12, 14 and causes the submarine vessel to move upwardly or downwardly to the preselected hover depth at a rate proportional to the computer output signal until the vessel is in a hovering condition. As the submarine vessel approaches the preselected hover depth, the electrical signal from pressure sensing unit 20 to hover computer 22 varies proportionally as the depth error decreases and, consequently, the hover valves 24 are positioned to vary the flow rate from or to the hover tanks in proportion to the computer output signal. The electrical output of a feed-back potentiometer 29 represents actual valve position and is transmitted to hover computer 22 via feed-back loop 31 for comparison with ordered valve position in a manner known in the field of servo control systems.

Each pumping system 16, 18 includes a four-port hover valve 24, conduits 26, 32 connecting two of the hover valve ports to the inlet and outlet respectively of a constant flow rate pump 34, a sea conduit 36 connected to one of the hover valve ports and communicating with the sea through hull opening 41, and a ballast conduit 38 connected to the remaining hover valve port and communicating with the hover tank 12, 14 through opening 43. The sea conduits 36 may be provided as shown with shut-off valves 40 which are remotely operable by means external to the hover tanks 12, 14 as, for example, hydraulic actuators 42. Motors 44 are mounted on pressure boundaries 15 externally of the hover tanks 12, 14 and are operatively connected to constant delivery pumps 34 through tank penetration fittings 45 in pressure boundaries 15. While the embodiment described includes dual pumping systems, a single system or multiple systems with increased or decreased capacity could be utilized.

Figure 2:
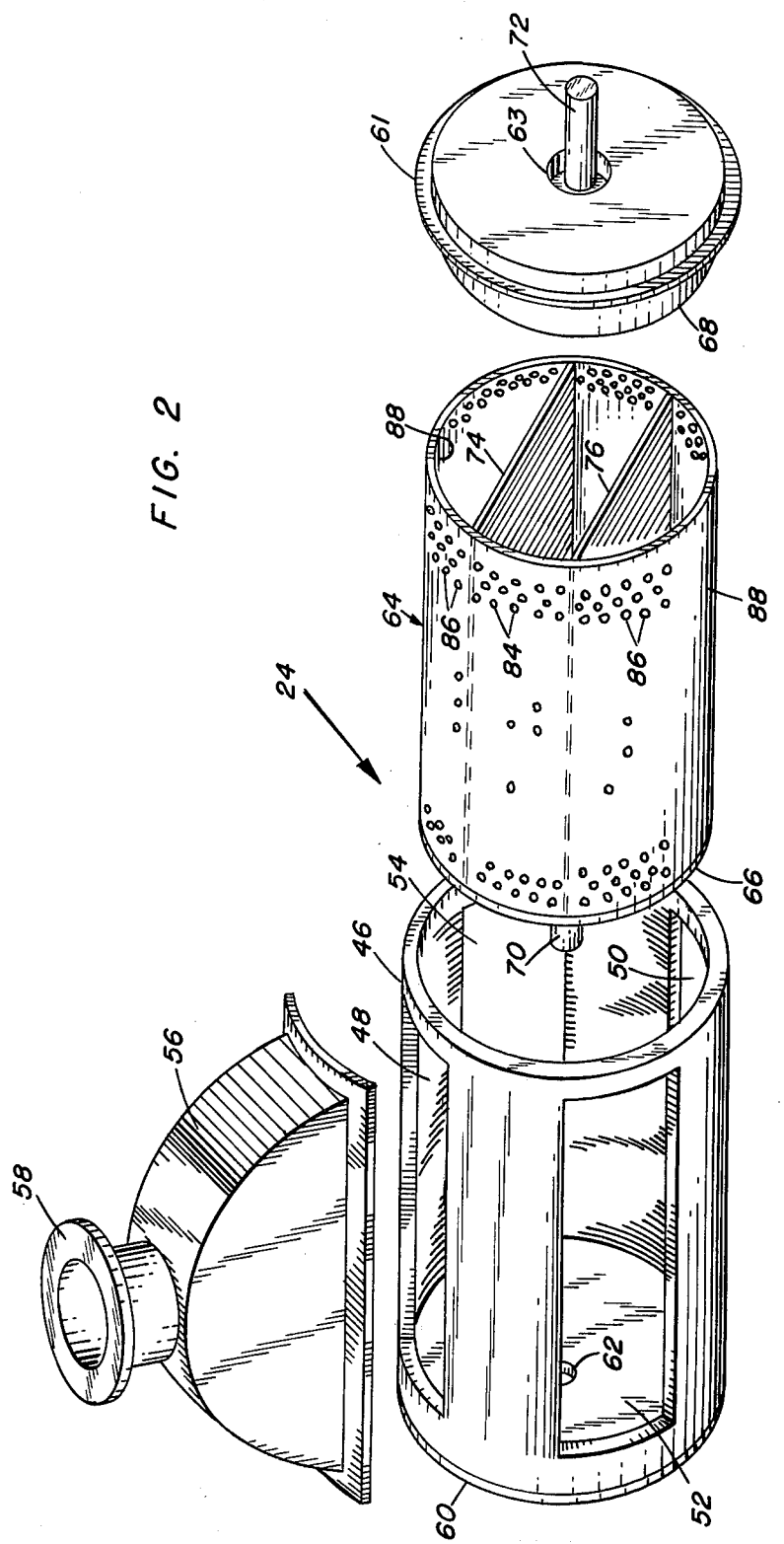
FIG. 2 is an exploded view of an embodiment of the rotary hover control valve of the present invention.
Figure 3:
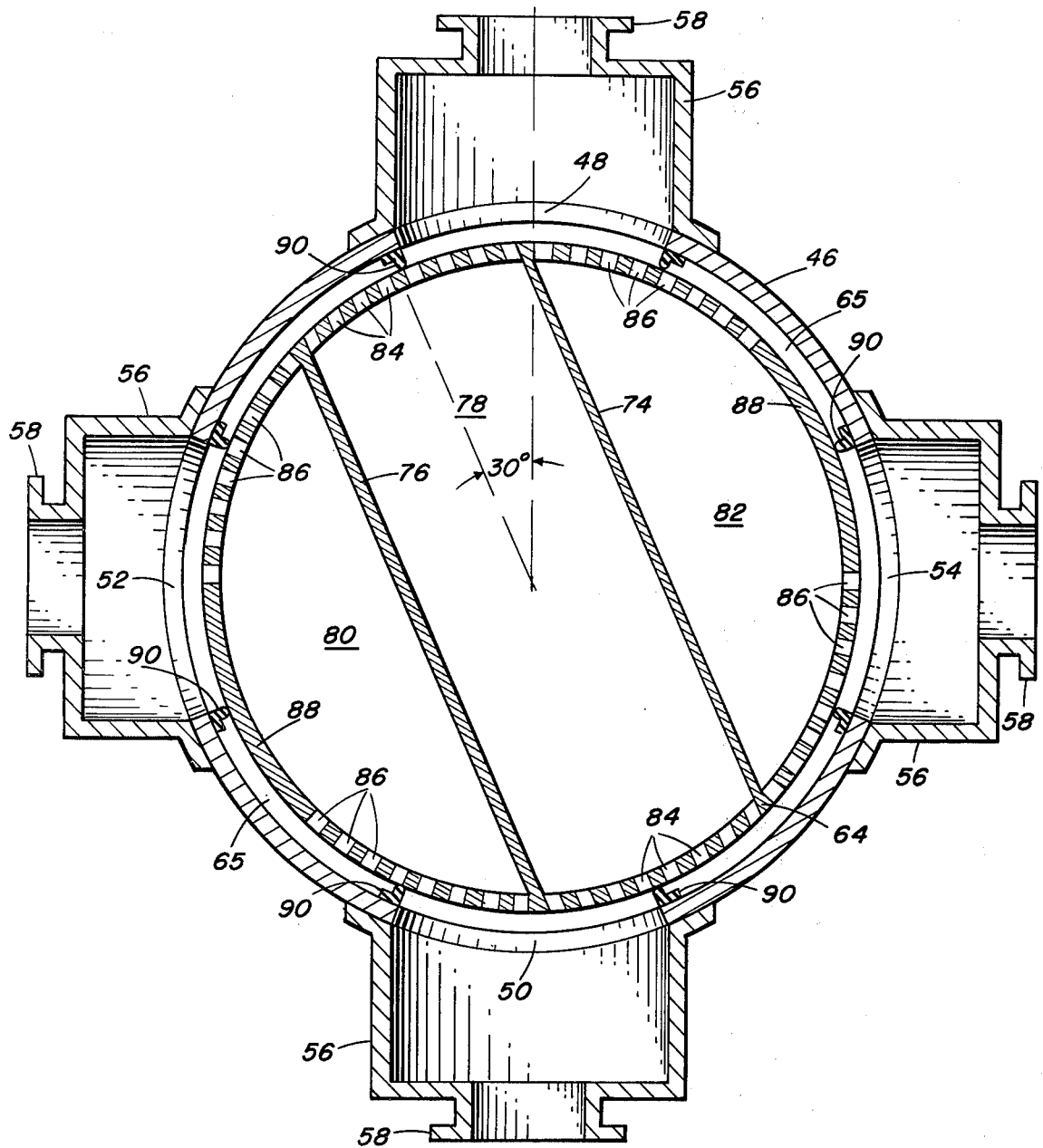
FIG. 3 is a cross-sectional view of the rotary valve of FIG. 2.

FIGS. 2 and 3 show in greater detail the construction of the hover valve 24 of the present invention. An elongated cylindrical valve housing 46 is provided with four equal-sized rectangular slot-like openings 48, 50, 52, 54 disposed lengthwise of and symetrically spaced around the periphery of the housing 46. The solid portions of the cylindrical wall of the valve housing are approximately equal in width to the four slot-like openings so that each opening and each solid portion forms about a 45° sector of the valve housing circumference. Four port covers 56 (one shown typically) are sealingly secured by welding or by suitable fasteners and gaskets to the external surface of the cylindrical housing over the slot-like openings 48, 50, 52, 54 so as to communicate with the interior of the housing 46. The outwardly extending end of each port cover 56 is provided with a flanged pipe termination 58 for connection to the system conduits 26, 32, 36 and 38, previously mentioned. The housing 46 is closed on one end by a cover 60 having a bearing 62 axially mounted on the inner surface thereof. The other end of the housing 46 is provided with a removable end closure 61 sealingly secured by suitable fasteners to the housing 46. Bearing 63 extends axially through end closure 61.

A rotatable cylindrical valve element 64 having an outside diameter less than the inside diameter of the housing 46 is concentrically positioned internally of the housing 46 so as to form a uniform annular space 65 between the interior surface of the valve housing 46 and the exterior of the valve element 64. Both axial ends of the valve element 64 are enclosed by plates 66, 68 which are circumferentially welded to opposite ends of the valve element 64. A shaft 70, axially affixed to plate 66 and extending outwardly therefrom, is journaled in bearing 62. Similarly, shaft 72, axially affixed to plate 68 and extending outwardly therefrom, is journaled in and protrudes through bearing 63 in end closure 61. Hover valve actuator 30 of FIG. 1 is operatively connected to shaft 72.

A pair of longitudinally extending parallel partitions 74, 76 span the interior of cylindrical valve element 64 and are equally spaced from the element axis. The partitions 74, 76 divide the interior of the valve element 64 into three chambers, a central chamber 78 and two side chambers 80, 82, the spacing between the partitions 74, 76 being approximately equal to the width of the rectangular slot-like openings in the valve housing 46. It should be noted that the partitions 74, 76 form chords of the circular cross-section of the valve element 64, each chord subtending arcs of about 135°. The arcuate surface of each side chamber 80, 82 therefore includes about 135° of the valve element circumference while the arcuate surfaces of the central chamber 78 includes the remaining 90° thereof (45° per side). The flat surfaces of the partitions 74, 76 may be provided with an acoustic damping material affixed thereto in any convenient manner for attenuating mechanical resonances that may be present in the partitions while the hovering system is in operation.

The opposite sides of central chamber 78 formed by the cylindrical wall of the valve element 64 are each perforated with an equal number of evenly-spaced 0.75 inch diameter apertures 84 extending over an appreciable portion of the length of the opposite sides of central chamber 78. The cylindrical wall of each side chamber 80, 82 is perforated over an appreciable portion of its length with a plurality of evenly-spaced 1.0 inch diameter apertures 86, an equal number thereof arranged on either side of and separated by an imperforate portion 88 formed in the centrally located 45° sector of each side chamber. The total number of apertures 86 in each side chamber 80, 82 is equal to the total number of apertures 84 in the central chamber 78 and, consequently, there are twice as many apertures 86 as apertures 84 in the cylindrical wall of the valve element 64.

It is to be understood that the shape, numbers and dimensions of the above-mentioned apertures are by way of example only and apertures of other sizes and or shapes and numbers could be judiciously selected and utilized to achieve the results set forth later herein. For example, the apertures may be longitudinal, circumferential or diagonally arranged slots. The particular aperture configuration of the embodiment described herein was chosen for a system flow rate of about 500 lb/sec so as to limit fluid velocity through the apertures to a maximum of about 15 ft/sec. At velocities above about 15 ft/sec undesirable flow noise may be generated. A successfully tested embodiment of the hover valve of the present invention was provided with a valve element having 105 circular apertures in each of the six 45° perforate sectors of the cylindrical wall of the valve element 64. The apertures in each sector were arranged in 21 staggered circumferential rows of 5 apertures each.

Elongated L-shaped resilient seals 90 are longitudinally secured to the interior surface of the valve housing 46 adjacent both sides of each slot-like opening in the valve housing. During operation of the hover valve, the seals 90 prevent unwanted flow between adjacent valve ports through the annular space 65.

Figure 4:
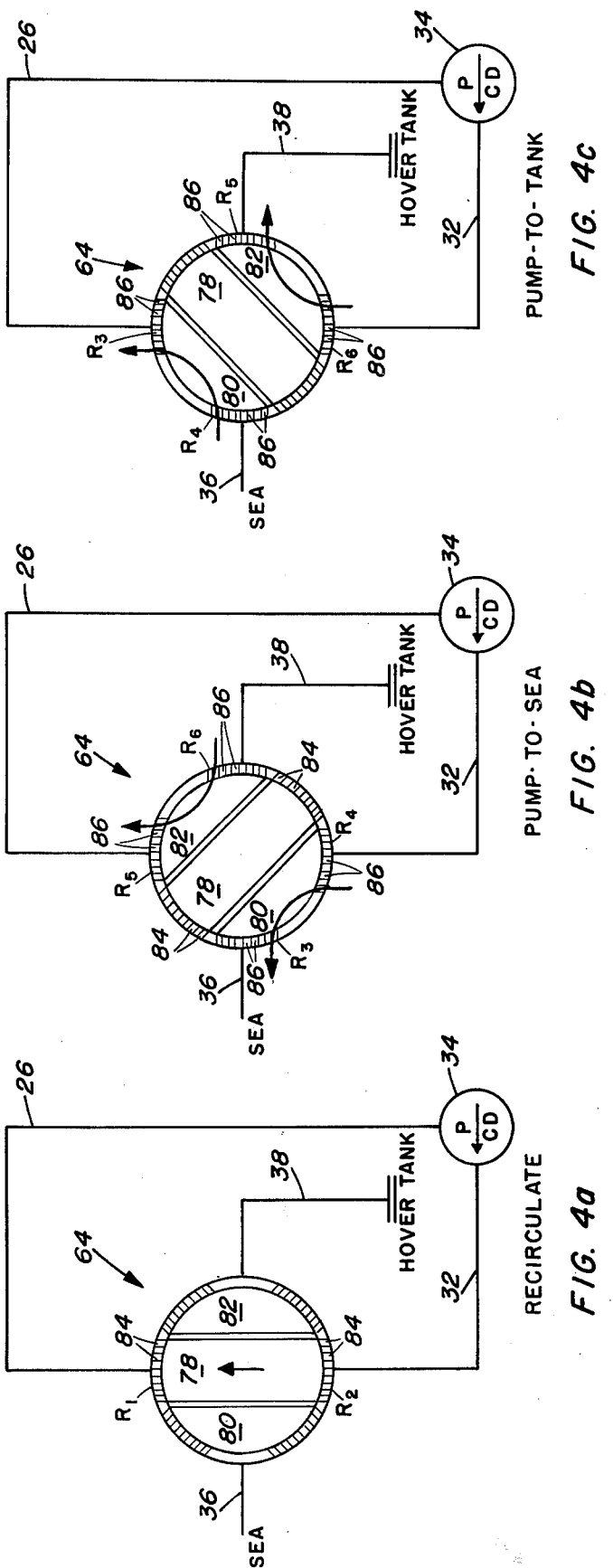
FIG. 4a–4c are diagramatic views of a submarine hovering system depicting the rotary valve of the present invention in three different operating positions.

The operation of the hover valve 24 of the present invention can best be illustrated by reference to FIGS. 4a–4c wherein the pumping system is diagrammatically shown in three discrete operating positions, namely, recirculate FIG. 4a, pump-to-sea FIG. 4b and pump-to-tank 4c. In the recirculate position the submarine vessel is assumed to be correctly ballasted for hovering, therefore, the entire flow from constant flow rate pump 34 is directed through the central chamber 78. The flow resistances presented by the perforate walls of the central chamber 78 are represented by $R_1$ and $R_2$. Since there are an equal number of apertures 84 on opposite sides of the central chamber 78, $R_1$ is approximately equal to $R_2$ and the total flow resistance of the valve may be stated as $2R_1$. In the embodiment shown the total angular displacement of the valve element 64 is limited to the 90° arc between the positions of FIGS. 4b and 4c. If the submarine vessel is at a depth below the desired hovering depth the pressure sensing unit 20 of FIG. 1 generates and transmits to the hover computer 22 an electrical signal proportional to the depth error. The hover computer 22, in turn, causes the hover valve actuator 30 to rotate the hover valve element 64 counterclockwise from the recirculate position to a position, for example, as that shown in FIG. 4b, the pump-to-sea position. In this mode it is to be observed that total system flow passes through the valve twice, once through side chamber 80 and again through side chamber 82. The flow resistances presented by the perforate walls of side chamber 80 are represented by $R_3$ and $R_4$ and of side chamber 82 by $R_5$ and $R_6$. Since there are an equal number of apertures 86 in each perforate portion of the side chambers 80, 82, it can be stated approximately that $R_3 = R_4 = R_5 = R_6 =$ or that the total flow resistance through valve element 64 is approximately $4R_3$. By making $R_3$ equal to one-half $R_1$ it is apparent that the total flow resistance of the valve in the pump-to-sea position of FIG. 4b is substantially equivalent to that in the recirculate position of FIG. 4a. In like manner, if the submarine vessel is at a depth above the desired hovering depth, the hover valve element 64 is rotated clockwise to the pump-to-tank position in FIG 4c, again with no change in total flow resistance. For valve element positions intermediate those of FIGS. 4a–4c, for example, the position shown in FIG. 3, the apertures 84 and 86 are so arranged that the total flow resistance of the hover valve remains essentially constant regardless of the rotational position within the 90° operating range of the valve element 64 with respect to valve housing 46. Alternatively, the apertures 84 and 86 may be of the same size and the total flow resistance through the valve for any angular position may be maintained constant by increasing the number of apertures in the side chamber perforate sections.

In the embodiment shown and described herein, it should be noted that the cross-sectional area of each of the 1.0 inch diameter apertures 86 is somewhat less than twice the cross-sectional area of each of the 0.75 inch diameter apertures 84. Theoretically, the ratio between the size of apertures 86 and apertures 84 should be 2:1, however, based on a mathmatical model of the present hovering system flow, the ratio was established at about 1.78:1.

As hereinabove stated, the pressure head on hover tanks 12, 14 is maintained at ambient sea pressure by an independently controlled air system. The valve element 64 is thus hydrodynamically balanced since there is no appreciable pressure differential between sea conduit 36 and ballast conduit 38 in pump-to-sea or pump-to-tank positions. This feature reduces the force required to rotate valve element 64. In the recirculate position of FIG. 4a no pressure differential between the sea and the hover tank can affect the balance of the valve element in any event because the solid imperforate central portions of side chambers 80, 82 prevent communication therebetween. Additionally, by maintaining tank pressure at ambient sea pressure, the constant delivery pumps are not required to overcome the pressure differential which would ordinarily exist between the sea and the hover tank and, consequently, may be operated at a constant speed whether recirculating or pumping to either sea or hover tank. Once sea pressure is established in the hovering tank at the desired operating depth, air is not required since water is pumped into and out of the same tank. Normal excursions in water volume and air pressure do not actuate the air system and do not materially affect performance of the system. Another important advantage of utilizing the rotary valve of the present invention in a submarine hovering system is that the pumping means may be a constant speed, constant delivery pump and need not be reversible.

Figure 5:
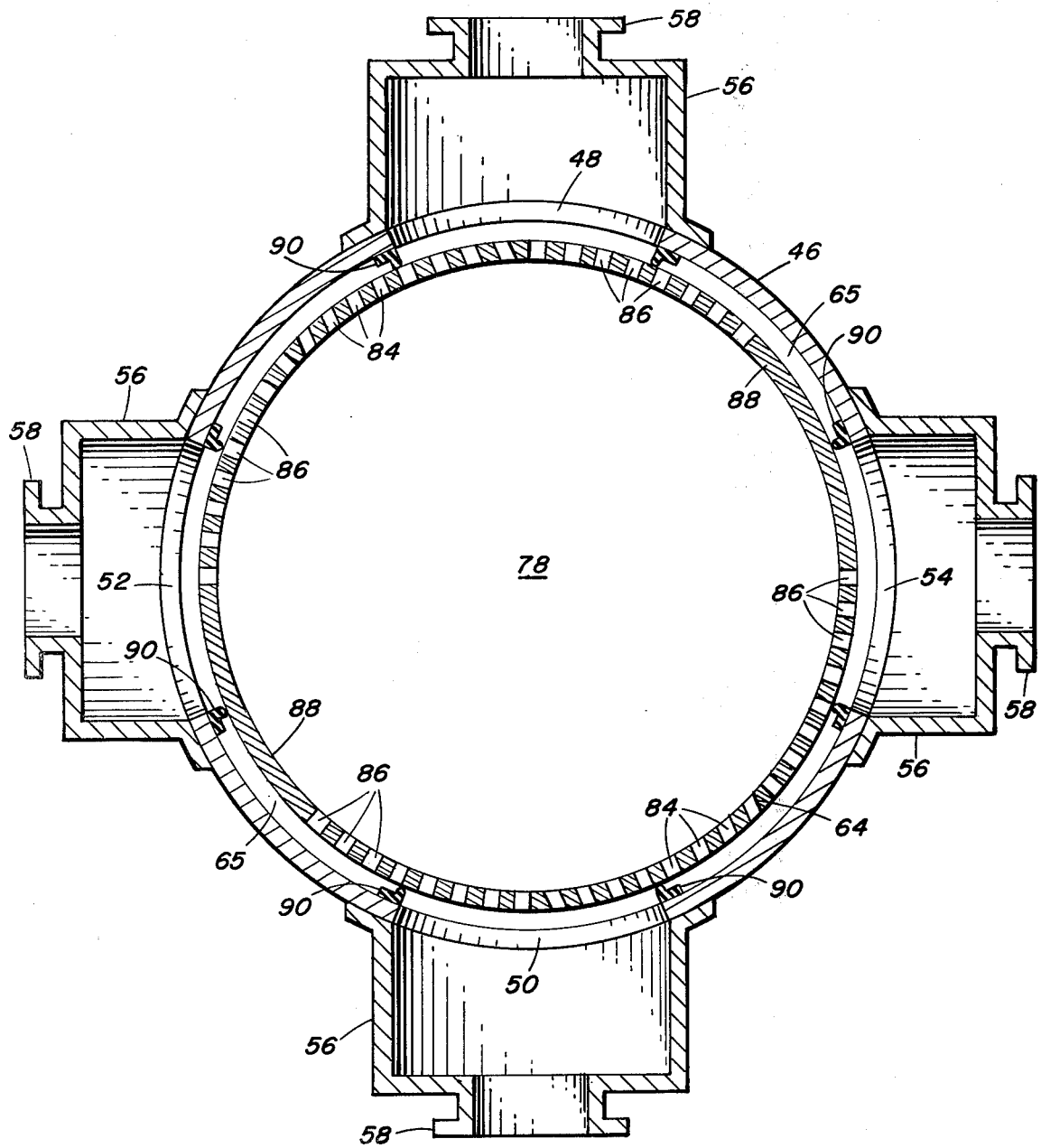
FIG. 5 is a cross-sectional view of another embodiment of the invention.

It will be appreciated by those skilled in the art that if the pressure differential between ambient sea pressure and the hover tank pressure could be continuously and accurately maintained at zero, the partitions 74, 76 could be eliminated from the valve element structure without appreciably altering the operating characteristics of the system. Accordingly, an alternate embodiment of the present invention is shown in FIG. 5 which illustrates a hollow valve element. If the structural integrity of the valve element demands, there may be provided either a single longitudinal partition extending across the interior of the valve element 64 between the mid-points of the portions of the cylindrical wall perforated with apertures 84 or plural circular plates spanning the interior of the valve element 64 transversely of its axis.

The present invention provides a novel, low-noise, constant flow rate submarine hovering system and hover control valve therefor. The hover control valve is provided with a rotary valve element with apertures arranged to produce constant total flow resistance regardless of the rotational position of the valve element. The hovering system, therefore, can be operated by a unidirectional flow pump which is driven by a constant speed motor.

It is understood that the principles of the present invention require that the total flow resistance of the hover valve be substantially constant and independent of the variable distribution of water flow therethrough caused by angular displacement of the valve element. Further, the invention is not intended to be limited, for example, by the particular number, size or shape of the valve element apertures disclosed nor by the particular means for fastening or sealing the connections between the various valve components. Nor is it intended that the usefulness of the novel rotary valve described herein be limited to submarine hovering systems. Accordingly, many uses, modifications and variations of the present invention are possible in light of the above teachings and within the purview of the appended claims without departing from the spirit and intended scope of the invention.

What is claimed is:

1. A rotary control valve comprising:
   valve housing means with an essentially cylindrical chamber formed around a central axis and having a plurality of openings spaced around the cylindrical periphery thereof:
   cylindrical valve means positioned coaxially within said cylindrical chamber and arranged for rotation about said central axis, said cylindrical valve means having a first plurality of aperture means through oppositely disposed portions of the cylindrical wall of said cylindrical valve means, said aperture means being disposed over an appreciable portion of the length of said cylindrical valve means, and a second plurality of aperture means through the cylindrical wall of said cylindrical valve means on both sides of said first plurality of aperture means and adjacent thereto, said second plurality of aperture means extending over an appreciable portion of the length of said cylindrical valve means;
   partition means extending lengthwise within said cylindrical valve means so that the oppositely disposed portions of the cylindrical wall wherein said first plurality of aperture means are located are spanned, said partition means being positioned so that the interior of said cylindrical valve means is divided into at least two sections for the purpose of preventing unwanted crossflow between said openings in said valve housing means; and
   means for rotating said cylindrical valve means in order to control the flow through said plurality of openings in said valve housing means;
   said first and second plurality of aperture means being selectively registrable with said openings in said valve housing means upon rotation of said cylindrical valve means, the numbers, sizes and locations of the aperture means of said first and second plurality of aperture means being so chosen and arranged that the total flow resistance to the flow of fluid through said rotary control valve is substantially constant and independent of the rotational position of said cylindrical valve means with respect to said valve housing means.

2. A rotary control valve according to claim 1 including solid imperforate portions of the cylindrical wall of said valve means separating the apertures of said second plurality of aperture means on each of said both sides, said imperforate portions being oppositely located approximately mid-way between the oppositely disposed aperture means of said first plurality of aperture means.

3. A rotary control valve according to claim 2 wherein the aperture means of said second plurality of aperture means on both sides of said solid imperforate portions are equal in number.

4. A rotary control valve according to claim 3 wherein the number of aperture means of said second plurality of aperture means is approximately twice the number of aperture means of said first plurality of aperture means and the aperture size of said second plurality of aperture means is larger than the aperture size of said first plurality of aperture means.

5. A rotary valve as defined in claim 1, wherein said valve means is spaced from said housing means, said housing means having resilient seals located in the space between said housing means and valve means and secured to the interior of said housing means adjacent both sides of each of said plurality of openings.

6. In combination, a rotary valve according to claim 1, wherein the openings in said housing constitute four ports,
   resilient seals secured to the interior wall of said housing means adjacent to the sides of each of the four ports and positioned to protrude into the space between said housing means and said cylindrical valve means for preventing unwanted flow between adjacent ports,
   a tank surrounding said valve,
   a constant flow rate pump connected to the inlet and outlet ports of said valve;
   a sea conduit connecting a third port of said valve to the exterior of said tank;
   and a ballast conduit connected to the fourth port of said valve.

7. A rotary control valve as defined in claim 1, wherein said partition means comprises:
   a pair of parallel partitions extending lengthwise of said cylindrical valve means and equally spaced from said central axis, said partitions dividing the interior of said cylindrical valve means into a central chamber and two side chambers with said first plurality of aperture means disposed between said pair of parallel partitions.

8. A rotary control valve comprising:
   a valve housing with a chamber formed around a central axis and havng a plurality of openings symmetrically spaced around the periphery thereof;
   a cylindrical valve element enclosed within said housing and arranged for rotation about said central axis;
   a pair of parallel partitions extending lengthwise of said valve element and equally spaced from said central axis, said partitions dividing the interior of said valve element into a central chamber and two side chambers;
   a first plurality of aperture means through oppositely disposed portions of the cylindrical wall of said central chamber between said partitions, said aperture means being disposed over an appreciable portion of the length of said central chamber; and
   a second plurality of aperture means through the cylindrical wall of said valve element extending over an appreciable portion of the length of each of said side chambers, there being a solid imperforate portion of the cylindrical wall in each of said side chambers, said solid imperforate portion separating the aperture means of each of said side chambers into approximately an equal number of aperture means;
   said first and second plurality of aperture means being selectively registrable with said openings in said valve housing upon rotation of said valve element, the numbers, sizes and locations of the aperture means of said first and second plurality of aperture means being so chosen and arranged that the total flow resistance to the flow of fluid through said rotary control valve is substantially constant and independent of the rotational position of said valve element with respect to said valve housing.

9. A rotary control valve according to claim 8 wherein said valve housing has four slot-like rectangular openings and wherein the aperture size of said first plurality of aperture means is less than the aperture size of said second plurality of aperture means.

10. A submarine hovering system comprising:
tank means adapted to be enclosed within a submarine hull for containing a variable quantity of water ballast;
a constant delivery pump having an inlet conduit and an outlet conduit;
a hover valve having a first port connected to said inlet conduit, said first port communicating with the interior of said valve, a second port connected to said outlet conduit and communicating with the interior of said valve, a third port connected by a conduit to said tank means and communicating with the interior of said valve and a fourth port communicating with the interior of said valve and connected to a conduit adapted to communicate with the water surrounding said submarine hull, said hover valve further comprising a rotatable cylindrical valve element enclosed interiorly of said hover valve, said valve element having a plurality of aperture means in the cylindrical wall thereof for variably and selectively distributing the flow among said ports upon rotation of said valve element, the numbers, sizes and locations of said aperture means being so chosen and arranged so that the total flow resistance of said hover valve remains substantially constant and independent of the variable distribution of water flow among said ports.

11. A submarine hovering system according to claim 10 including a constant speed motor for operating to said pump.

12. A submarine hovering system according to claim 10 including means for maintaining the pressure in said hover tank approximately equivalent to ambient sea pressure.

13. A submarine hovering system according to claim 10 wherein the size of said apertures is further chosen so as to limit the flow velocity therethrough to about 15 ft/sec.

14. A submarine hovering system according to claim 10 further including:
pressure sensing means for sensing the difference between a preselected hover depth and ambient sea pressure and generating an electrical signal in response to said difference; and
hover computer means electrically connected to said pressure sensing means and responsive to said electrical signal for controlling the rotational position of said cylindrical valve element relative to said valve housing whereby the flow into and out of said hover tank varies proportionally with said difference.

15. A hover control system for a submarine, said submarine having within its hull a pair of hover tanks in the lower portion of its hull;
a vertical partition constituting a pressure boundary between said tanks;
a horizontal partition across said hull above said tanks and constituting a horizontal pressure boundary;
each of said tanks having a separate four-port rotary valve connected thereto for controlling the flow therein, each valve having a rotatable cylindrical valve element with a central axis, said valve element being positioned within a valve housing, each of said cylindrical elements having a shaft connected thereto at one of its ends for rotating said cylindrical element about said central axis, said valve housing having a plurality of ports spaced around said central axis;
the ports of said housing being connected to spaced-apart areas on said housing and in communication with the interior of said housing;
said horizontal pressure boundary having therein openings for venting the air above the ballast water in said tanks;
said horizontal pressure boundary having above it in the upper portion of said hull a pressure sensitive unit communicating with ambient sea pressure through an opening in said hull for generating an electrical signal proportional to the difference between the pressure at the preselected lower depth and the ambient sea pressure, a hover computer connected to the output of said pressure sensitive unit and responsive to the electrical signal therefrom, a hover valve servo-control system connected to said computer and responsive to the output signal therefrom, said hover valve servo-control system including a valve actuator which is connected to both shafts of the rotatable cylindrical valve elements of said rotary valves in said tanks;
each of said rotary valves including;
a first plurality of aperture means through oppositely disposed portions of the cylindrical wall of said valve element, said aperture means being disposed over an appreciable portion of the length of said valve element;
a second plurality of aperture means through the cylindrical wall of said valve element on both sides of said first plurality of aperture means and adjacent thereto, said second plurality of aperture means extending over an appreciable portion of the length of said valve element, and
partition means extending lengthwise within said valve means so that the oppositely disposed portion of the cylindrical wall wherein said first plurality of aperture means are located are spanned, said partition means being positioned so that the interior of said valve means is divided into at least two sections for the purpose of preventing unwanted cross-flow between said ports in said valve housing means;
said first and second plurality of aperture means being selectively registrable with said ports in said valve housing upon rotation of said valve element, the numbers, sizes the locations of the aperture means of said first and second plurality of aperture means being so chosen and arranged that the total flow resistance to the flow of fluid through said rotary control valve is substantially constant and independent of the rotation position of said valve element with respect to said valve housing.

16. A system as defined in claim 15, including:
a constant flow rate pump connected to the inlet and outlet ports of each rotary valve,
a sea conduit connected to a third port of said rotary valve,
and a ballast conduit connected to the fourth port of said rotary valve.

17. A system as defined in claim 16 including resilient seals secured to the interior of said housing adjacent the sides of the ports of said rotary valve and positioned to protrude into the space between said housing and said rotatable cylindrical valve element for preventing unwanted flow between adjacent ports.

* * * * *